(12) United States Patent
Kwon et al.

(10) Patent No.: US 6,312,875 B1
(45) Date of Patent: Nov. 6, 2001

(54) METHOD FOR MANUFACTURING A MULTIDOMAIN LIQUID CRYSTAL DISPLAY PANEL

(75) Inventors: Soon Bum Kwon, Seoul; Young Seok Choi, Daejeon, both of (KR); Yuriy Reznikov; Oleg Yaroshchuk, both of Kiev (UA)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/685,603

(22) Filed: Oct. 11, 2000

Related U.S. Application Data

(63) Continuation of application No. 09/140,554, filed on Aug. 26, 1998, now Pat. No. 6,169,591.

(30) Foreign Application Priority Data

Sep. 5, 1997 (KR) ................................. 97-45950

(51) Int. Cl.[7] ................................................ G02F 1/1337
(52) U.S. Cl. .............................................. 430/321; 430/396
(58) Field of Search ................................... 430/320, 321, 430/20, 396; 349/124, 129

(56) References Cited

U.S. PATENT DOCUMENTS

| | | |
|---|---|---|
| 5,555,114 | 9/1996 | Narita et al. .......................... 359/65 |
| 5,657,105 | 8/1997 | McCartney ........................... 349/157 |
| 5,739,883 * | 4/1998 | Chen et al. .......................... 349/124 |
| 5,818,560 * | 10/1998 | Kouno et al. ........................ 349/129 |
| 5,824,377 | 10/1998 | Pirwitz et al. ............................ 428/1 |
| 5,850,273 | 12/1998 | Terashita et al. ..................... 349/129 |
| 5,859,682 | 1/1999 | Kim et al. ............................. 349/124 |

FOREIGN PATENT DOCUMENTS 2315875A 2/1998 (GB) .

OTHER PUBLICATIONS

Dyadyusha et al., "Properties of NEC Films Planarly Oriented by the Anisotropic Surface Without Microrelief", *Mol. Mater.*, Vol. 5, p. 183 (1995).
Gibbons, W. M. et al., "Surface mediated alignment of nematic liquid crystals with polarized laser light", *Nature*, Vol. 351, pp. 49–50 (1991).
Iimura, Y. et al., "Alignment Control of a Liquid Crystal on a Photosensitive Polyvinylalcohol Film", *Jpn. J. Appl. Phys.*, Vol. 32, pp. 93–96 (1993).
Marusii, T. Y. et al., "Photosensitive Orientants for Liquid Crystal Alighment", *Mol. Mat.*, Vol. 3, pp. 161–168 (1993).
Schadt, M. et al., "Surface–Induced Parallel Alighment of Liquid Crystals by Linearly Polymerized Photopolymers", *Jpn. J. Appl. Phys.*, Vol. 31, pp. 2155–2164 (1992).
Shannon, P. J. et al., "Patterned optical properties in photo-polymerized surface–aligned liquid–crystal films", *Nature*, Vol. 368, pp. 532–533 (1994).

* cited by examiner

*Primary Examiner*—John A. McPherson
(74) *Attorney, Agent, or Firm*—Morgan, Lewis & Bockius LLP

(57) ABSTRACT

A method for manufacturing a multidomain liquid crystal display panel, including the steps of forming a photo-alignment layer on a substrate, positioning a mask having a plurality of regions with different photo-transmittances; and forming different alignment directions in different domains of the photo-alignment layer corresponding to each of the plurality of regions by irradiating the photo-alignment layer with light through the mask.

9 Claims, 4 Drawing Sheets

METHOD FOR MANUFACTURING A MULTIDOMAIN LIQUID CRYSTAL DISPLAY PANEL

This is a continuation application Ser. No. 09/140,554 filed on Aug. 26, 1998, now U.S. Pat. No. 6,169,591, and claims the benefit of Korean patent application No. 1997-45950, filed Sep. 5, 1997, which is hereby incorporated by reference.

BACKGROUND OF THE INVENTION

1. Field of the Invention

The present invention relates to a liquid crystal display panel, and more particularly, to a method for manufacturing a multidomain liquid crystal display panel.

2. Discussion of the Related Art

Generally, a liquid crystal of a liquid crystal display (LCD) panel includes anisotropic molecules. The average direction of the molecules' long axes is referred to as a director. The director distribution in the liquid crystal is determined by an anchoring energy of the liquid crystal on a substrate, and is characterized by an orientation of the director corresponding to a minimum of a surface energy of the liquid crystal and the anchoring energy. Reorientation of the director is achieved by applying an external electric field to the liquid crystal.

A basic unit of an LCD panel includes two glass substrates with the liquid crystal positioned between them. To obtain uniform brightness and a high contrast ratio in the LCD panel, it is necessary to homogeneously align the liquid crystal in a liquid crystal cell.

The most common technique for achieving homogeneous alignment includes forming microgrooves on a surface of a polymer. This results in a strong anchoring energy that provides a stable liquid crystal alignment. This technique is called a rubbing method, which is a simple method of rubbing a polymer-coated substrate with a cloth. The rubbing method is widely used, since it is fast and allows for large scale manufacturing.

The rubbing method, however, has several serious drawbacks. Because the shape of the microgrooves formed on the alignment layer depends on the rubbing cloth and a rubbing intensity, the alignment of the liquid crystal is often heterogeneous, causing phase distortion and light scattering. Further, electrostatic discharge (ESD) due to rubbing of a polymer surface generates dust contamination in an active matrix LCD panel, decreasing production yield and damaging the substrate.

In order to solve these problems, a photo-alignment method has been proposed using polarized ultraviolet light irradiated onto a photosensitive polymer (M. Schadt et al., *Jpn. J. Appl. Phys.*, 31 (1992) 2155; T. Ya. Marusii & Yu. A. Reznikov, *Mol. Mat.*, 3 (1993) 161). The alignment capability of a photosensitive polymer is determined by an anisotropy of the photosensitive polymer, which is induced by ultraviolet light irradiation.

Photo-alignment materials used in the LCD panels include polyvinylcinnamate (PVCN) (M. Schadt et al., *Jpn. J. Appl. Phys.*, 31 (1992) 2155), polysiloxane (PS), polyimide (PI), and the like. The photo-alignment properties of these materials appear after the ultraviolet light irradiation by a polarized light.

Moreover, these materials may be used on a base of a silicon polyimide copolymer doped with a diazodiamine dye, or on a base of a polymerizable nematic liquid crystal monomer composition for optical storage (W. M. Gibbons et al., *Nature*, 351 (1991) 49; P. J. Shannon et al., *Nature*, 368 (1994) 532). These materials are photosensitive in a visible spectrum.

While the alignment direction of the alignment layer is usually perpendicular to a polarization direction of the ultraviolet light used for irradiation, some materials provide an alignment direction parallel to the polarization direction of the ultraviolet light.

The photo-alignment method has various advantages over the conventional rubbing method. First, there is no electrostatic discharge from a rubbing cloth in rubbing, and therefore, the dust particles do not contaminate the substrate. Second, the photosensitive polymer is able to control the alignment direction and azimuthal anchoring energy of the alignment layer. This, therefore, determines alignment direction in the liquid crystal cell. The photo-alignment method is therefore used to form a multidomain liquid crystal cell, which improves the viewing angle characteristics of the LCD panel.

Several methods are known for forming the multidomain liquid crystal cell using the photo-alignment method.

A method proposed by W. M. Gibbons et al. (*Nature*, 351 (1991) 49) suggests that after rubbing a photosensitive polymer-coated substrate unidirectionally, the substrate may be irradiated by the ultraviolet light to form an alignment direction perpendicular to the rubbing direction. The LCD panel includes a first substrate, a second substrate rubbed in the same direction as the rubbing direction of the first substrate, and a liquid crystal between the first and second substrates. In the Gibbons method, however, it is necessary to use the rubbing method to make microgrooves in the alignment layer, which still causes problems with the electrostatic discharge and the dust contamination from rubbing.

Modification of the Gibbons method is proposed by P. J. Shannon et al. (*Nature*, 368 (1994) 532). In the Shannon method, instead of rubbing the alignment layer, the first alignment is performed by irradiating the alignment layer with polarized light. While the Shannon method overcomes the disadvantages of the rubbing method, it has a problem in that in order to change the alignment direction during the manufacturing process, two separate irradiation steps using polarized light are required, with the polarization directions being mutually perpendicular. Several processing steps are therefore needed.

SUMMARY OF THE INVENTION

Accordingly, the present invention is directed to a method for manufacturing a multidomain liquid crystal display panel that substantially obviates one or more of problems due to limitations and disadvantages of the related art.

An object of the present invention is to provide a method for manufacturing a multidomain liquid crystal display panel with a single irradiation step by ultraviolet light and visible light.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

To achieve these and other advantages and in accordance with the purpose of the present invention, as embodied and broadly described, in accordance with a first aspect of the present invention there is provided a method for manufacturing a multidomain liquid crystal display panel, including the steps of forming a photo-alignment layer on a substrate, positioning a mask having a plurality of regions with different photo-transmittances, and forming different alignment directions in different domains of the photo-alignment layer corresponding to each of the plurality of regions by irradiating the photo-alignment layer with light through the mask.

In another aspect of the present invention there is provided a multidomain liquid crystal display panel, including a first substrate and a second substrate, a liquid crystal positioned between the first substrate and the second substrate, and a photosensitive layer covering the first substrate and having a plurality of first domains and a plurality of second domains, wherein an alignment of photosensitive molecules in the plurality of first domains is orthogonal to alignment of photosensitive molecules in the plurality of second domains, wherein the photosensitive layer includes an ultraviolet light sensitive material and a visible light sensitive material.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Generally, it is known in the art that photosensitive materials provide an alignment direction of an alignment layer that is either horizontal or vertical relative to a polarization direction of ultraviolet light used for irradiation. Also, the alignment direction of the alignment layer is determined by a spectrum distribution of the light used to irradiate the alignment layer. That is, the alignment direction is determined by a chemical structure change of the alignment material due to visible light and ultraviolet light irradiation.

Figure 1:
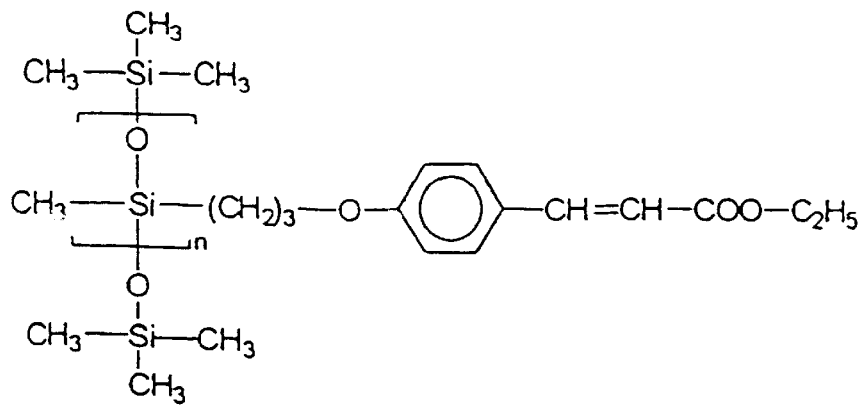
FIG. 1 shows a formula of an alignment layer material PSCN-1 according to a first embodiment of the present invention.
Figure 2:
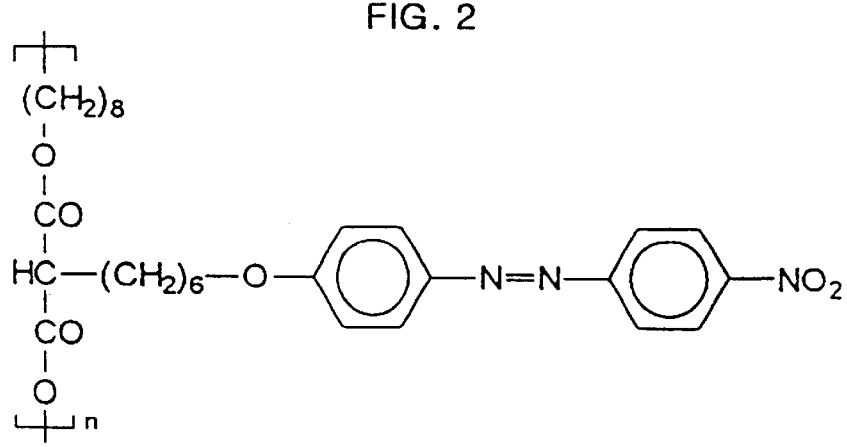
FIG. 2 shows a formula of an alignment layer material AB (azobenzene) according to the first embodiment of the present invention.
Figure 3:
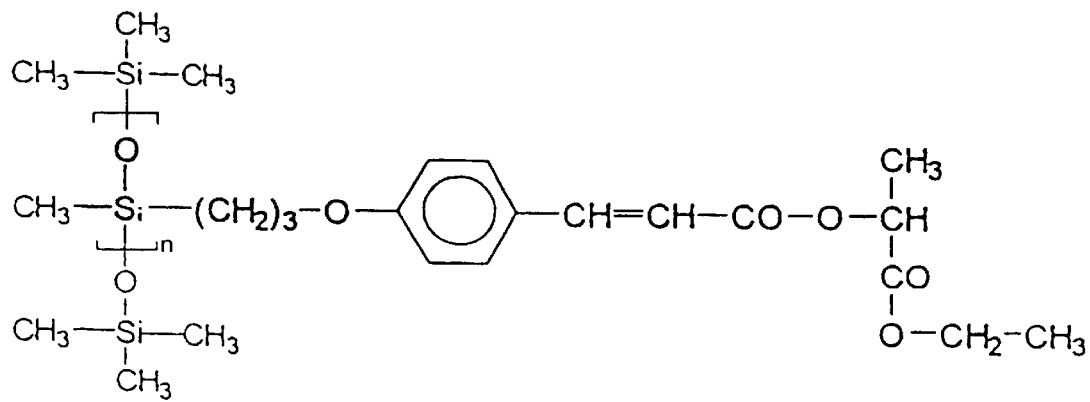
FIG. 3 shows a formula of an alignment layer material PSCN-2 according to second and third embodiments of the present invention.

For example, when a PSCN-1 polymer, shown in FIG. 1, is irradiated by 260 nm ultraviolet light of intensity 2–5 mW/cm$^2$ for 5 minutes, an alignment direction that is horizontal relative to a polarization direction of the ultraviolet light is created. Also, if a PSCN-2 polymer, shown in FIG. 3, is irradiated under the same conditions for 30 minutes, the PSCN-2 polymer exhibits similar properties. These materials absorb light in a wavelength range of 200–400 nm. In the PSCN-1 and PSCN-2 as above, the end groups of the siloxane, —OSi(CH$_3$)$_3$, are substituted with other functional groups, such as OH, and the like. And the repeat unit: n in the FIGS. 1, 2, and 3 is 1 to 40, and preferably is 32.

Furthermore, polymers absorbing light in a visible spectrum exhibit good photo-alignment properties. For instance, AB (azobenzene), shown in FIG. 2, absorbs light in a wavelength range of 400–500 nm and has a photo-induced alignment direction that is vertical relative to the polarization direction of the irradiating light.

This result can also be obtained by doping a low-molecular-weight anisotropic dye into the photosensitve polymer. For example, if polysiloxane and polyimide doped with a diazodiamine dye and azo dye molecules are irradiated by a polarized visible light, an alignment direction that is vertical to the polarization direction of the visible light is created (W. M. Gibbons et al., Nature, 351 (1991) 49; Y. Iimura et al., Jpn. J. Appl. Phys. 32 (1993) L93; A. Dyadyusha et al., Mol. Mater. 5 (1995) 183).

Figure 4:
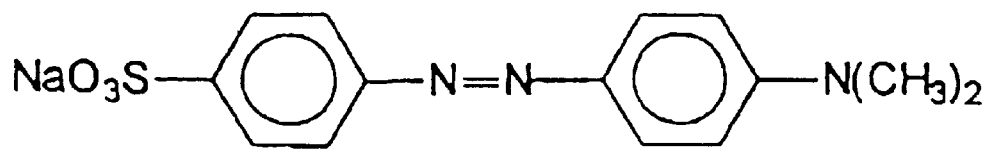
FIG. 4 shows a formula of an alignment layer material methylorange according to the second embodiment of the present invention.
Figure 5:
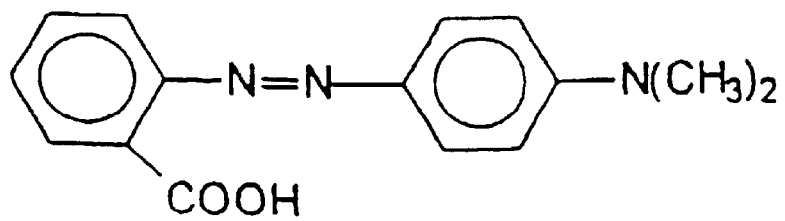
FIG. 5 shows a formula of an alignment layer material methylred according to the third embodiment of the present invention.

Moreover, if the PSCN-1 and PSCN-2 polymers doped with azo dyes methylorange (shown in FIG. 4) and methylred (shown in FIG. 5) are irradiated by a polarized light in their absorption bands, which correspond to a transmission region of the PSCN-1 and PSCN-2 polymers, an alignment direction that is horizontal relative to the polarization direction of the irradiating light is created.

These results motivate a new method to achieve multidomain liquid crystal alignment in an LCD panel. The present invention uses the above photo-alignment properties to control the alignment direction of the alignment layer by a single photo-irradiation step. The alignment layer includes a combination of materials that possess different absorption bands and result in mutually orthogonal alignment directions depending on the wavelength of the irradiating light.

A method for manufacturing the multidomain LCD panel of the present invention uses irradiation of different regions of the substrate (here, $\Delta\lambda_{/\!/}$ region and $\Delta\lambda_\perp$ region), such that liquid crystal alignment is formed in orthogonal directions. $\Delta\lambda_{/\!/}$ light is light irradiating the $\Delta\lambda_{/\!/}$ region that induces liquid crystal to align horizontally to the polarization direction of irradiated light, and $\Delta\lambda_{/\!/}$ light is light of irradiating the $\Delta\lambda_\perp$ region that induces the liquid crystal to align vertically to polarized direction of irradiated light. As a result, domains of the alignment layer so irradiated are aligned to have mutually orthogonal directions. A substrate having the photo-alignment layer so irradiated can then be used for manufacturing the multidomain LCD panel.

Figure 6:
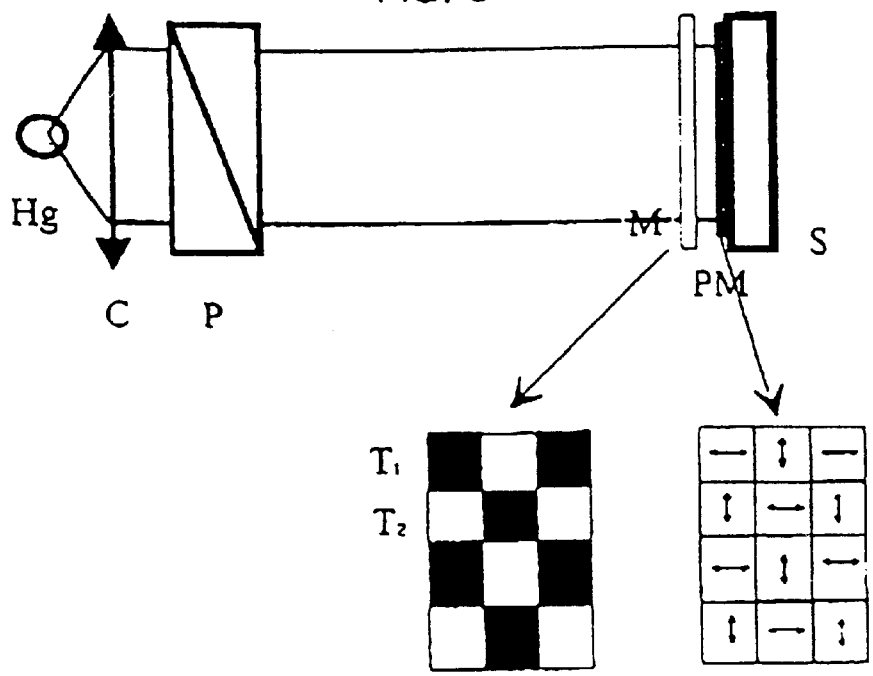
FIG. 6 shows an experimental setup for forming a multidomain alignment direction on the alignment layer according to the present invention.

An experimental setup for forming the multidomain alignment direction of the alignment layer is shown in FIG. 6. A substrate is covered with a photo-alignment material PM. The irradiating light includes $\Delta\lambda_/$ light and $\Delta\lambda_\perp$ light emitted by a mercury (Hg) lamp. The photo-alignment material PM includes a mixture that results in mutually orthogonal alignment directions after irradiating, thereby forming the photo-alignment layer. The irradiated light passes through a polarizer P that linearly polarizes the light, a condenser C, and a mask M.

The mask M includes two types of regions. The first region ($T_1$) passes $\Delta\lambda_/$ light, but not $\Delta\lambda_\perp$ light. The second region ($T_2$) passes $\Delta\lambda\perp$ light, but not $\Delta\lambda_/$ light. As a result of the irradiating, a photo-alignment region corresponding to the first region ($T_1$) has an alignment direction that is horizontal relative to the irradiating light, and a photo-alignment region corresponding to the second region ($T_2$) has as alignment direction that is vertical relative to the irradiating light.

In the multidomain LCD panel of the present invention, a pixel is formed with the alignment directions of each domain being mutually orthogonal. For example, it is possible to fabricate a cell with a first substrate having the alignment layer photo-irradiated and the second substrate having the alignment layer aligned unidirectionally. The alignment layers are placed so that the alignment direction of the unidirectional alignment layer coincides with one of the alignment directions of photo-alignment layer. The liquid crystal then aligns homogeneously in a region where the alignment directions of both substrates are parallel, and is twisted in a region where the alignment directions of both substrates are mutually orthogonal. If the liquid crystal cell is placed between a parallel and a crossed polarizer, it is possible to control brightness and darkness in the LCD panel.

The present invention allows manufacturing of a multidomain LCD panel having a wide viewing angle. The LCD panel has a twisted two-domain construction where the liquid crystal alignment of each domain is rotated 90° relative to a neighboring domain. Each domain has an asymmetric viewing angle, but when it is compensated by a sum of viewing angles of both domains, the viewing angle becomes symmetric.

In the first preferred embodiment, a solution of the PSCN-1 polymer and the AB polymer (weight ratio 2:1) in 1,2-dichloroethane is prepared. Total polymer concentration in the solution is 10 g/l. The polymers are coated onto a glass substrate by a spin-coating method for 30 seconds.

Figure 7:
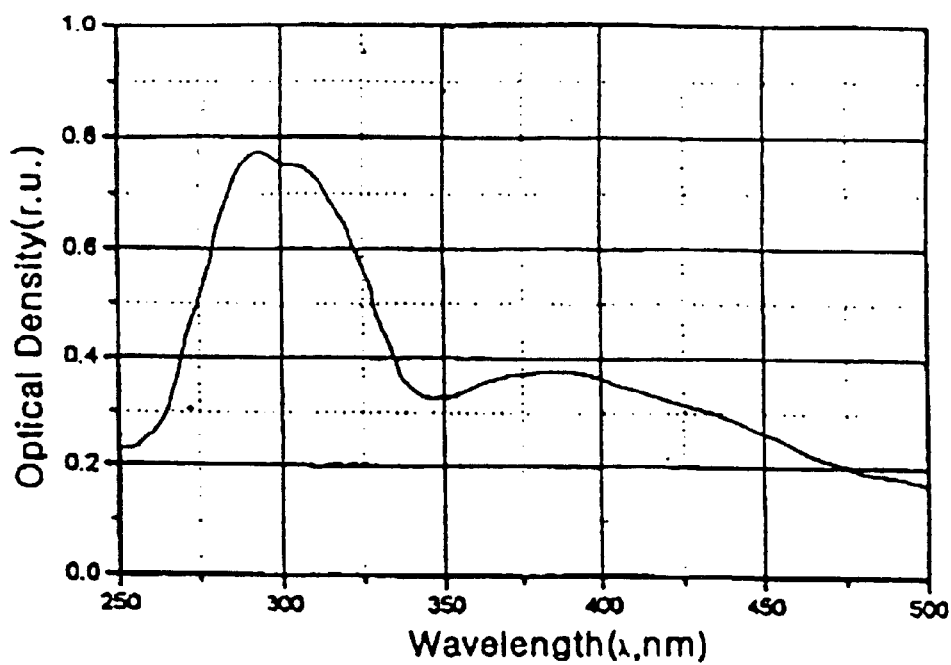
FIG. 7 shows an absorption spectrum of a mixture of the PSCN-1 and AB polymers.
Figure 8:
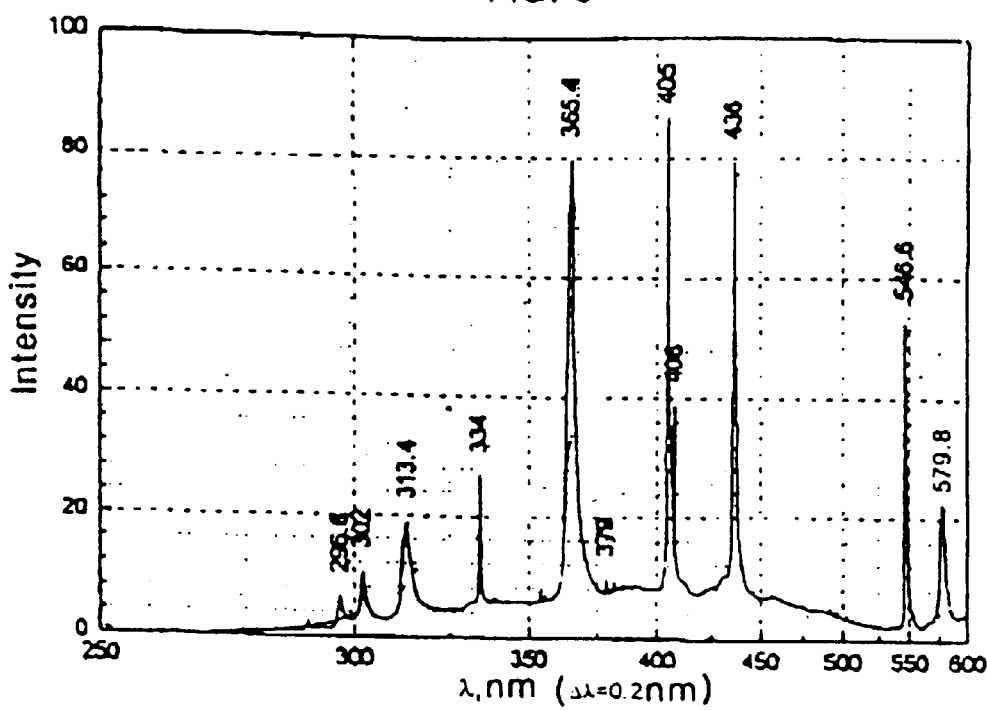
FIG. 8 shows an irradiation spectrum of an Hg lamp.

The rotation speed of a spin-coating machine is 4000 rev/minute. The substrate is treated by soft baking after centrifugal separation at 60° C. for 1 hour. Absorption spectrum of the polymers is shown in FIG. 7. The PSCN-1 polymer absorbs ultraviolet light, and the AB polymer absorbs the visible light;

The substrate is prepared by an experimental setup as shown in FIG. 6. The Hg lamp is a source of both the ultraviolet light and the visible light. The polarization direction of the ultraviolet light is parallel to a long side of the glass substrate. Emission spectrum of the Hg lamp is shown in FIG. 8 The emission spectrum is measured on MDR-12 with FhotoMult FEU-79 at P=250 W. Light intensity at the mask M is 3 mW/cm$^2$. The mask is a thin glass substrate 2×3 cm$^2$, with pieces of a polymer film 1×1 mm$^2$ in a lattice arrangement positioned on its surface. The polymer film blocks the ultraviolet light but passes the visible light emitted by the Hg lamp (see FIG. 8). The substrate is irradiated for 15 minutes.

The liquid crystal cell includes the first substrate formed with the alignment layer and the second glass substrate coated with a polyimide CU-2012 and rubbed. The alignment layer has unidirectional alignment parallel to the long side of the substrate, and the liquid crystal cell is then fabricated using conventional methods. The cell gap is 0.5 μm and is filled with a liquid crystal ZLI 4801-000 at a room temperature. The liquid crystal cell is placed between crossed polarizers.

Figure 9:
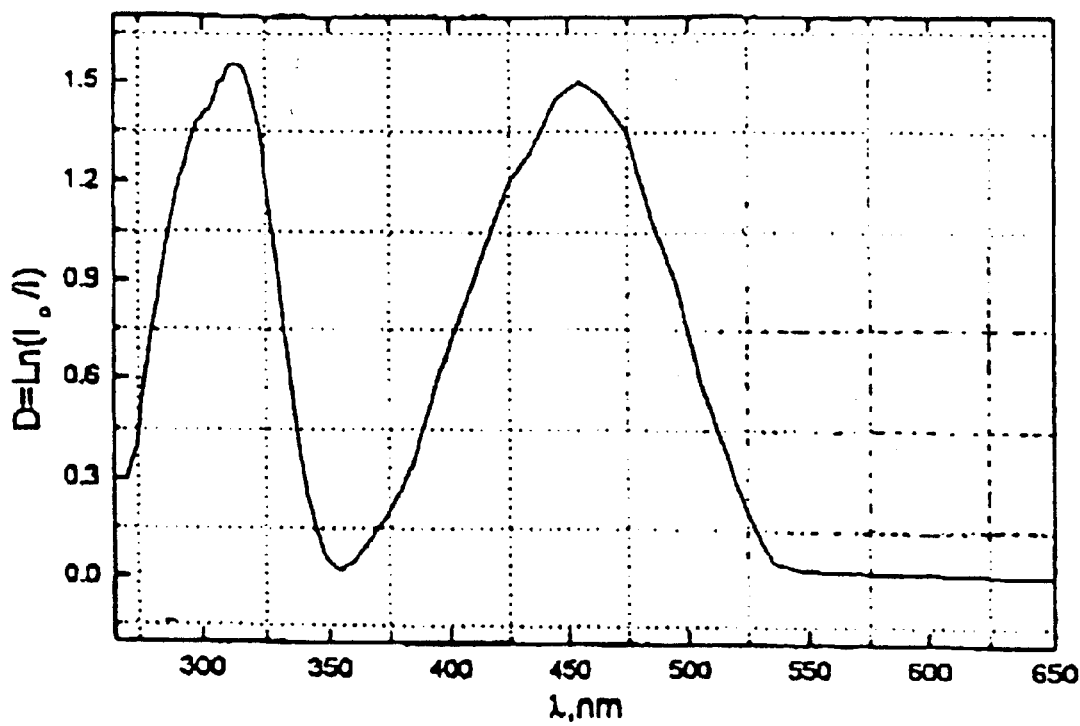
FIG. 9 shows an absorption spectrum of the PSCN-2 polymer doped with an azo dye methylorange.

In a second preferred embodiment, similar to the first preferred embodiment, a mixture of the PSCN-2 polymer and methylorange is used as a photo-alignment layer. Weight concentration of methylorange in the PSCN-2 polymer is 20%. The irradiation of a substrate is carried out for 5 minutes and results similar to the first preferred embodiment are obtained. An absorption spectrum of the photo-alignment material of the second preferred embodiment is shown in FIG. 9.

Figure 10:
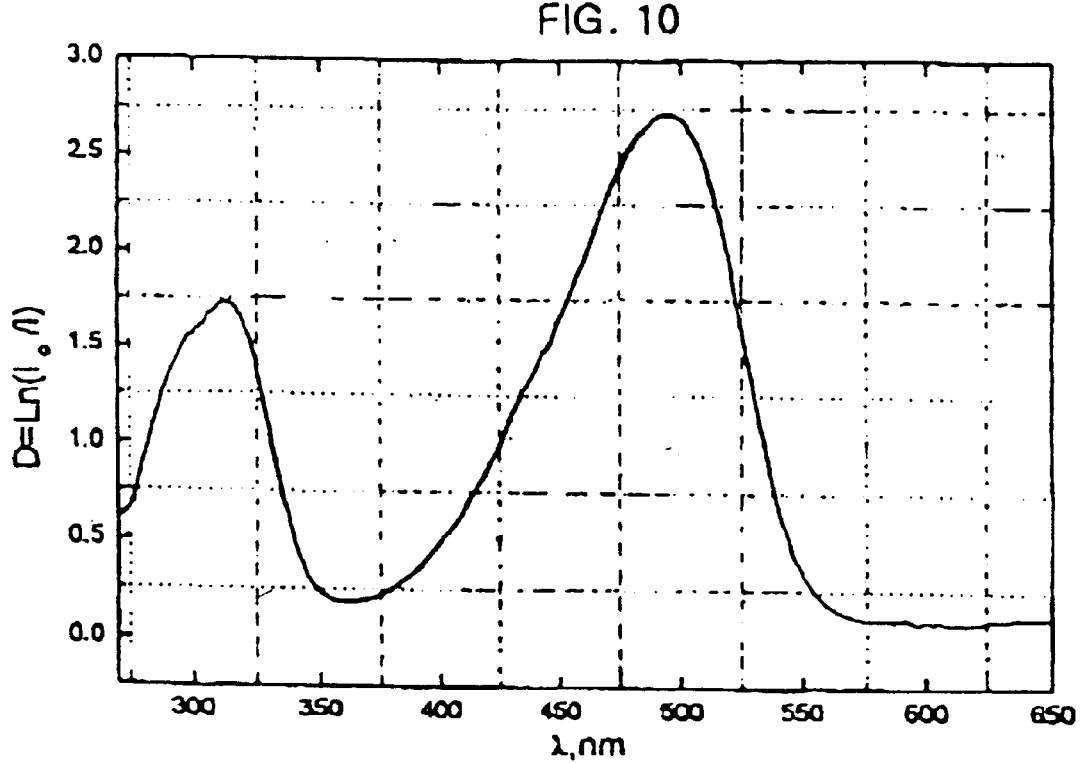
FIG. 10 shows an absorption spectrum of the PSCN-2 polymer doped with an azo dye methylred.

In a third preferred embodiment, similar to the first preferred embodiment, a mixture of the PSCN-2 polymer and methylred is used as the photo-alignment layer. Weight concentration of methylred in the PSCN-2 polymer is 30%. A substrate coated with the mixture is irradiated for 30 minutes, with results similar to the first preferred embodiment. Absorption spectrum of the mixture of the PSCN-2 polymer and methylred is shown in FIG. 10.

A method for manufacturing the multidomain LCD panel of the present invention is, described using an alignment layer that includes materials having different absorption bands and results in mutually orthogonal alignment directions after irradiation by light of different wavelength regions. Therefore, only a single photo-irradiation step is required for a mask having a plurality of regions with different light transmission properties. Furthermore, the multidomain LCD panel has good wide viewing angle characteristics, and can also be used for optical information storage devices.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for manufacturing a multidomain liquid crystal display panel comprising the steps of:

forming a photo-alignment layer on a substrate;

positioning a mask having a plurality of regions with different ranges of wavelength; and forming different alignment directions in different domains of the photo-alignment layer corresponding to each of the plurality of regions by irradiating the photo-alignment layer with light through the mask, wherein a single exposure is used to irradiate the photo-alignment layer.

2. The method of claim 1, wherein the photo-alignment layer includes a mixture of photosensitive materials photo-reacting to light of different wavelength ranges.

3. The method of claim 1, wherein the wavelength includes ultraviolet light.

4. The method of claim 1, wherein the wavelength includes visible light.

5. The method of claim 1, wherein the photo-alignment layer includes a mixture of polysiloxanecinnamate and methyl orange.

6. The method of claim 1, wherein the photo-alignment layer includes a mixture of polysiloxanecinnamate and methyl red.

7. The method of claim 1, wherein the alignment direction includes orthogonal direction.

8. The method of claim 1, wherein the alignment direction is horizontal relative to a polarization of the light.

9. The method of claim 1, wherein the alignment direction is vertical relative to a polarization of the light.

* * * * *